June 8, 1954  E. H. SAVELA ET AL  2,680,403
SHOCK ABSORBING DEVICE FOR BREAD TOASTERS
Filed Sept. 15, 1949  3 Sheets-Sheet 1
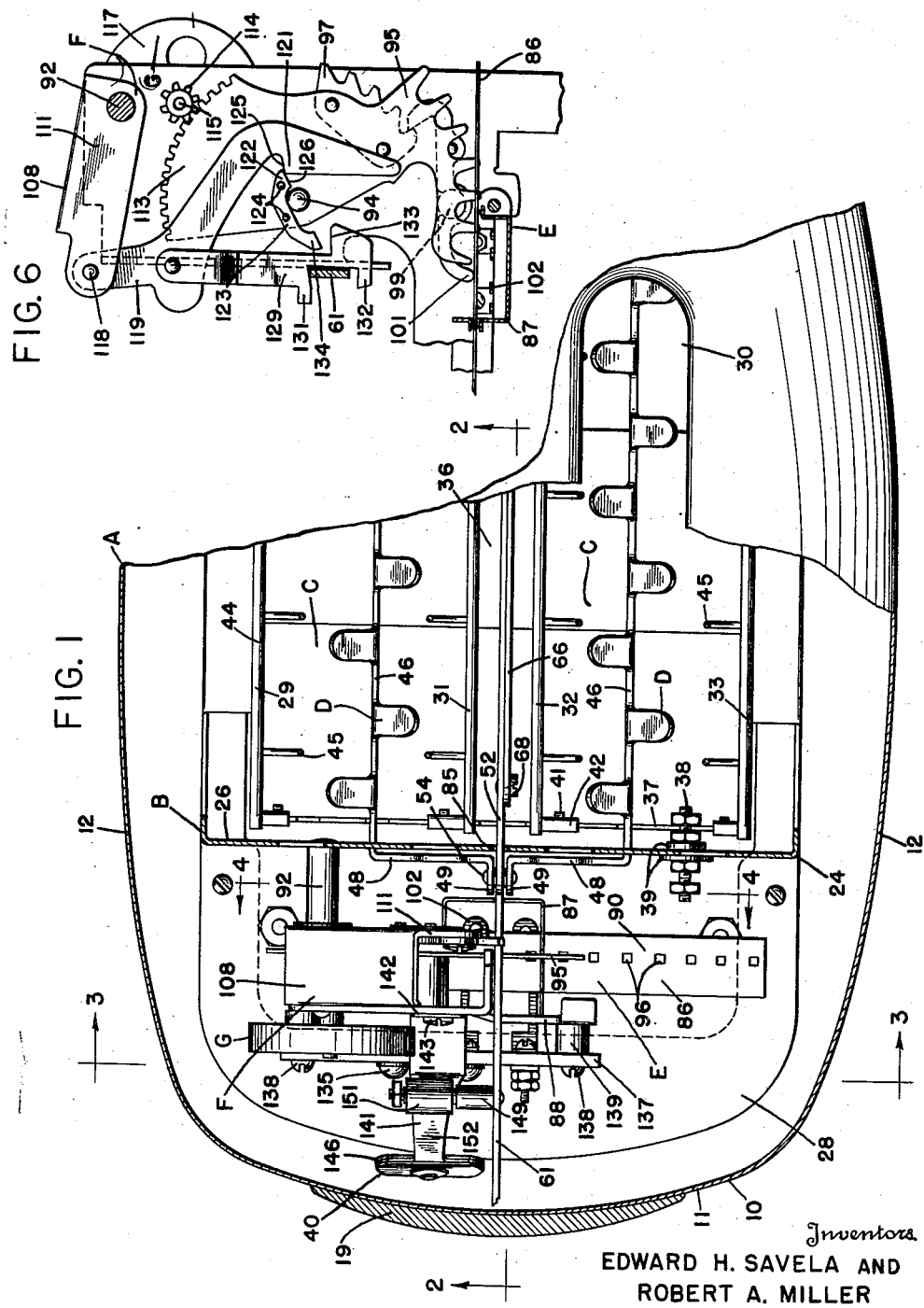
Inventors
EDWARD H. SAVELA AND
ROBERT A. MILLER
By Caswell & Lagaard
Attorneys June 8, 1954  E. H. SAVELA ET AL  2,680,403
SHOCK ABSORBING DEVICE FOR BREAD TOASTERS
Filed Sept. 15, 1949  3 Sheets-Sheet 2
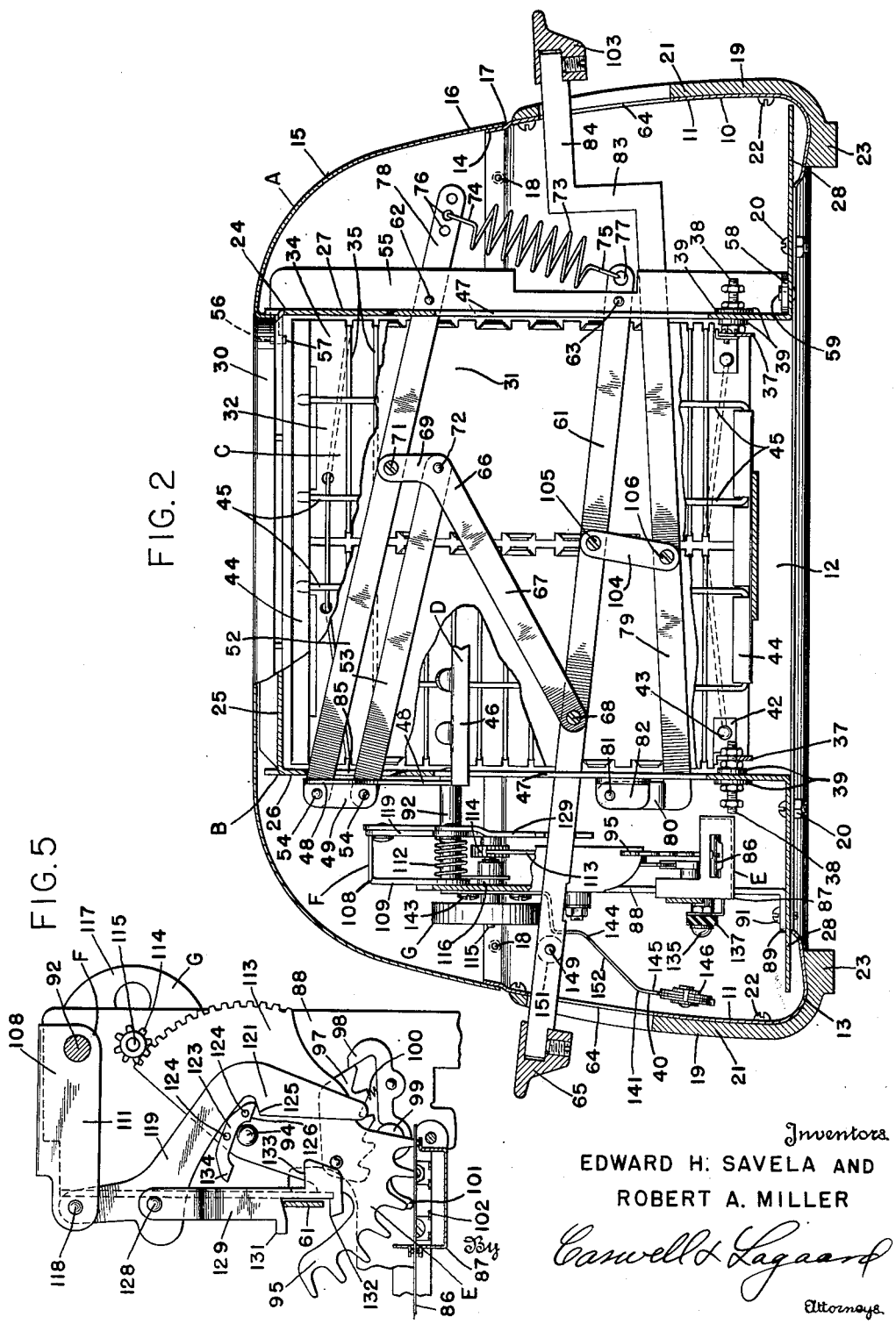
Inventors
EDWARD H. SAVELA AND
ROBERT A. MILLER

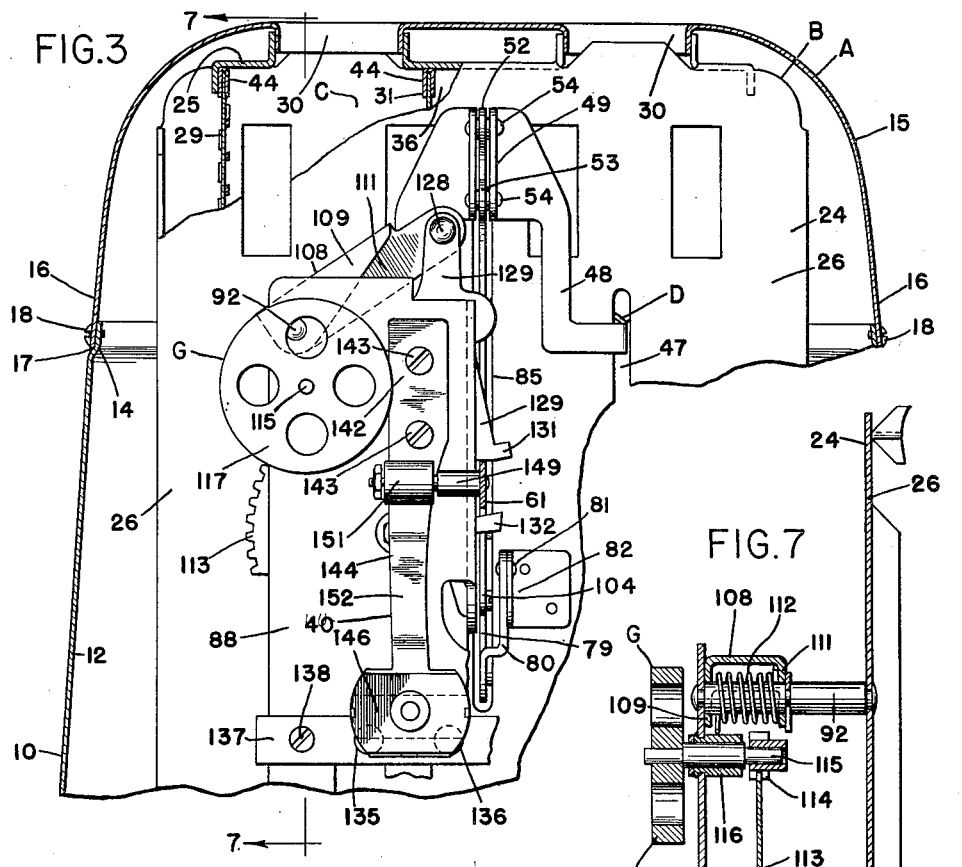

Patented June 8, 1954

2,680,403

UNITED STATES PATENT OFFICE 2,680,403

SHOCK ABSORBING DEVICE FOR BREAD TOASTERS

Edward H. Savela and Robert A. Miller, Grand Haven, Mich., assignors to Camfield Manufacturing Company, Grand Haven, Mich., a corporation of Michigan Application September 15, 1949, Serial No. 115,816

5 Claims. (Cl. 99—329)

The object of the instant invention resides in providing a shock absorbing device for bread toasters constructed as hereinafter set forth and having the functions and advantages recited.

The bread toaster disclosed in this application consists of a case A in which is disposed a framework B. The framework B and associated parts provides two vertical bread ovens C into which the bread may be placed through suitable openings in the upper portion of the case A. Within the framework B is disposed two vertically movable bread racks D which support the bread within the ovens C and which are spring biased to non-toasting position. An operating lever pivoted to the framework and connected to the bread racks is adapted to move the bread racks to toasting position. A timing device E is adapted to determine the cooking period and operates to release a latching device F whereupon the bread racks are returned to normal position at the end of the cooking period. The shock occasioned upon release of the bread racks is absorbed by a shock absorbing device G. This device includes a flywheel adapted to be energized by the spring means moving the bread racks to normal position and slows down the movement of said bread racks without interfering with the proper ejection of the bread from the toaster.

In the drawings:

Fig. 1 is a plan view of a portion of an electric toaster illustrating an embodiment of our invention with portions broken away to illustrate the construction thereof.

Fig. 2 is a longitudinal elevational sectional view of the toaster taken substantially on line 2—2 of Fig. 1.

Fig. 3 is a fragmentary cross sectional view taken substantially on line 3—3 of Fig. 1.

Fig. 4 is a sectional view taken on line 4—4 of Fig. 1.

Fig. 5 is a view similar to Fig. 4 showing the parts in altered position.

Fig. 6 is a view similar to Fig. 5 showing the parts in still different position.

Fig. 7 is a sectional view taken on line 7—7 of Fig. 3.

The case A of our invention as best shown in Fig. 2 consists of a lower case section 10 which extends about the entire toaster and which has ends 11 and sides 12. The lowermost part of the case section 10 has a flange 13 extending inwardly therefrom and on which the toaster mechanism rests. The upper part of the section 10 has an offset 14 formed in the same and which provides a recess 17. Overlying the section 10 is an upper case section 15. This case section is dome-shaped in form and the lower marginal portion 16 of said case section is received within the recess 17 formed by the offset 14. Screws 18 extending through the lowermost marginal portion 16 and threaded into the offset 14 hold the parts of the case assembled. Attached to the ends 11 of case section 12 are end pieces 19 which are preferably constructed of some plastic material and which form ornaments for dressing up the case structure. These end pieces have body portions 21 which overlie the ends 11 of the case and are secured thereto by means of screws 22. These end pieces furthermore have feet 23 which are disposed beneath the section 10 and support the entire toaster above the table on which it rests to provide ventilation and retard the transfer of heat to the table. The section 15 of the case A is constructed with openings 30 which register with the bread ovens C and through which the bread may be inserted into said ovens and placed upon the bread racks D.

Within the case A is located the framework B which supports the mechanism of the invention. This framework consists of a frame 24, of inverted U-shaped form, having an upper longitudinally extending frame member 25 and two vertically extending frame members 26 and 27 connected thereto. The frame members 26 and 27 have flanges 28 projecting outwardly therefrom and lying in a common plane. These flanges rest upon the flange 13 and support the frame structure through the lower case section 10. Screws 20 hold the framework B attached to the case A.

Within the framework B is provided four heating elements 29, 31, 32 and 33 which consists of sheets of mica 34 on which are wound suitable resistors 35. These heating elements in conjunction with the vertical frame members 26 and 27, form the two bread ovens C which are disposed between the heating elements 29 and 31 and between the heating elements 32 and 33. The heating elements 31 and 32 are also separated from one another to form a space 36 therebetween and in which certain of the mechanism of the invention is disposed. For supporting the heating elements 29, 31, 32 and 33 two bars 37 are employed which extend transversely of the frame members 26 and 27 and are attached thereto by means of screws 38. The said screws are insulated from the frame by insulating washers 39. Other screws 41 extend through said bars and through angle brackets 42 secured to the various heating elements by means of rivets 43. The heating elements 29, 31, 32 and 33 have reinforcing strips 44 secured to the upper and lower ends of the same and which also serve for attachment of guide wires 45. These guide wires are spaced from the resistors 35 and prevent the toast from coming in direct contact therewith and burning.

For supporting the toast within the oven C the two bread racks D are employed. These bread racks consist of elongated bars 46 which extend through slots 47 in the vertical frame members 26 and 27 and are guided for vertical movement therein. One end of each of said bars has an arm 48 bent outwardly therefrom and which terminates in a lug 49. The lugs 49 straddle two levers 52 and 53 and are pivotally connected thereto by means of rivets 54.

The lever 52 is pivoted to an upright 55 by means of a rivet 62. This upright is secured to the frame B in the following manner: The upper end of said upright has a finger 56 which extends over the horizontal frame member 25 and is formed with a lug 57 which projects downwardly through said frame member. The lower end of the upright 55 has a flange 58 projecting outwardly therefrom which is secured by means of a rivet 59 to the flange 28 of frame 24. Another lever 61 hereinafter referred to as a rack lever is also pivoted to the upright 55 by means of a rivet 63 and extends through slots 85 in the frame members 26 and 27 of frame 24 and through a slot 64 in one of the ends 11 of the case section 10. This lever forms the operating member by means of which the bread racks D are moved into toasting position and by means of which the said bread racks may be subsequently released. The lever 61 has attached to it a knob 65 by which said lever may be depressed. Extending between the lever 52 and the lever 61 is a bell crank 66 which has one long arm 67 pivoted to the lever 61 by means of a screw 68. The said lever has a short arm 69 which is pivoted to the lever 52 by means of a screw 71. Lever 53 is pivoted to the bell crank 66 by means of a rivet 72. The ends of both of the levers 52 and 61 project outwardly beyond the vertical frame member 27. These ends of said levers have attached to them a tension coil spring 73 which has its ends 74 and 75 hooked into holes 76 and 77 in said levers. The end 78 of the lever 52 projects outwardly beyond the upright 55 an appreciable amount so that considerable movement is given to the lever 52 tending to urge the said lever upwardly and to move the bread racks D into non-toasting position.

The timing mechanism E on the invention is of the type disclosed in the patent to R. Sardeson 2,365,909 issued December 26, 1944. This timing mechanism includes a strip of bi-metal 86 which is mounted for reciprocating movement in a guide 87. Guide 87 is attached to an end plate 88 forming part of the framework B. The end plate 88 has a foot 89 which rests upon and is attached to the flange 28 of frame member 26 by means of a screw 91. The upper end of the said end plate is held in proper relation with the vertical frame members 26 by means of a spacer 92. The ends of said spacer are attached to the plate 88 and the vertical frame member 26 by riveting or otherwise.

Pivotally mounted on a shaft 94 is a gear segment 95 which is adapted to cooperate with a rack 90 formed on the strip of bi-metal 86 by means of spaced openings 96. The shaft 94 is secured to the plate 88. The gear segment 95 has attached to it a section 97 of a ratchet wheel, the teeth of which cooperate with a catch 98. Catch 98 is pivoted on a pintle 99 which is also attached to the plate 88. The said catch includes a finger 101 which rests on the bi-metal and which is adapted to be raised to disengage the catch 98 from the section 97 of the ratchet wheel and release the gear segment 95, one tooth at a time. A spring 100 secured to the catch 98 and to the plate 88 urges the finger 101 against the strip of bi-metal 86. The bi-metal is heated by means of a heater 102 disposed within the guide 87. It will readily be comprehended that the rate of heating of the bi-metal determines the length of time required for the operation of the timing mechanism E for each cooking period.

The latching device F includes a U-shaped arm 108 hereinafter referred to as a catch arm which has spaced flanges 109 and 111. This arm is pivotally supported on the spacer 92 which is in the form of a rod and which extends through the two flanges 109 and 111. A torsion spring 112 encircles the spacer 92 between the flanges 109 and 111 and is attached to flange 109 and to the plate 88 to cause said arm to swing normally upwardly as shown in Figs. 3 and 4.

The arm 108 has pivoted to the flange 109 thereof by means of a rivet 118 a depending latch 119. Latch 119 has a catch 121 at the lower end of the same which is formed with a surface 125 adapted to engage a corresponding surface 126 on a catch engaging member 122. This catch member forms part of a bar 123 which is secured to the gear segment 95 by means of rivets 124. Pivotally connected to the latch 119 by means of a rivet 128 is a depending link 129 which forms a connector between the latch 119 and the lever 61. This link is constructed with spaced fingers 131 and 132 at its lower end. These fingers straddle the lever 61 and when the said lever is moved downwardly the said link imparts to the latch 119 downward movement. Below the lever 61 is another lever 79. This lever extends completely through the frame 24 and its innermost end is formed with an upstanding arm 80. This arm is pivoted by means of a rivet 81 to a bracket 82 secured to the vertical frame member 26. The said lever has an offset 83 at its opposite end and which terminates in an extension 84 projecting through the slot 64 in the end 11 of case A. A knob 103 is attached to the projecting end of said lever. The levers 61 and 79 are connected together intermediate their ends by means of a link 104 which is pivoted to said levers by screws 105 and 106. The levers 52, 53, 61 and 73 all operate in slots 85 formed in the two vertical frame members 26 and 27.

The shock absorbing device G includes a gear segment 113 which is formed on the gear segment 95 and which is adapted to mesh with a gear pinion 114. This pinion is attached to a shaft 115 which is journaled in a bearing 116 mounted on the plate 88. A flywheel 117 is also attached to the shaft 115 and the said flywheel absorbs the energy produced by the spring 103 and allows the bread racks D to move less rapidly to normal position at the end of the timing period.

For resetting the timing device E link 129 is formed with a shoulder 133. This shoulder is adapted to engage a lug 134 on the bar 123 and to rotate the gear segment 95 in a direction opposite to that resulting from the operation of the timing mechanism E, thus resetting the timing mechanism.

For energizing the heating elements 29, 31, 32 and 33, a switch mechanism 40 is employed which includes two fixed contacts 135 and 136 which are mounted on a bar of insulating material 137. This bar is attached to the end plate 88 by means of screws 138. Spacers 139 encircling said screws and disposed between said bar and plate hold the bar spaced therefrom and contacts 135 and 136 free from the end plate 88. The contacts 135 and 136 are connected in the circuit for energizing the heating elements 29 in the customary manner. The switch mechanism 40 further includes a switch arm 141 which is constructed of resilient sheet material such as spring bronze or the like. The arm 141 has a base portion 142 which overlies the end plate 88 and which is secured thereto by means of screws 143. Outwardly from the base portion 142 is formed an offset 144 which spaces such portion from the end plate 88, and brings the extreme end 145 of said arm outwardly of and opposite the contacts 135 and 136. A movable contact member 146 is attached to the end 145 of arm 141 and insulated therefrom. The contact member 146 when moved into engagement with the contacts 135 and 136 closes the circuit through said contacts and heating elements 29, 31, 32 and 33 and causes the same to become energized.

Movement of the switch arm 141 to bring the movable contact member 146 into circuit closing position is accomplished as follows: Pivoted to a pintle 149 attached to lever 61 is a roller 151 which moves with said lever in an up and down direction. Traversing the direction of movement of said roller is a cam 152 which is formed in the intermediate portion of the arm 141 as best shown in Fig. 2. This cam traverses the direction of movement of the roller 151 and as said roller descends upon downward movement of lever 61 said roller engages said cam and forces said cam toward the right as shown in Fig. 2, bringing the contact member 146 into contact with the fixed contacts 135 and 136.

The operation of the invention is as follows: The parts are shown in normal position in Figs. 1, 2 and 4. Pressure on the knob 65 of lever 61 moves said lever downwardly and said lever engaging finger 132 moves link 129 downwardly and also latch 119. Catch 121 then engages the catch engaging member 122 and holds the bread racks D in toasting position with the parts of the timing device E and associated parts as shown in Fig. 5. At the same time roller 151 engages cam 152 and moves the switch contact member 146 into engagement with the fixed contacts 135 and 136. This completes the circuit through the heating elements and energizes the same. The timing mechanism E is now energized by spring 73 and commences to function. As the bi-metal 86 is heated by the heater 102 the same arches and swings finger 101 upwardly. This disengages the catch 98 from the ratchet segment 95 releasing the ratchet segment 95 to move one tooth at a time. During such movement the gear segment 113 drives the flywheel 117 and the shock is absorbed by the flywheel. As the said mechanism operates, shaft 94 and gear segment 95 rotate and the angularity of the surface 126 of catch engaging member 122 is changed till the catch 121 reaches the position shown in Fig. 6. During the final movement of the segment 95, flywheel 117 is set in rotation and the momentum of the same together with the energy imparted segment 95 from spring 73 serve to procure relative movement between the latch 121 and the latch engaging member 122. During such movement of member 122 the catch 121 slides off from the same. Spring 73 then moves lever 61 upwardly. This lever through finger 131 moves the link 129 upwardly. When the shoulder 133 engages lug 134, the segment 113 is rotated from the position shown in Fig. 6 to that shown in Fig. 4 the spring 73 serving to return the parts to normal position. After the catch 121 leaves the catch engaging member 122, spring 73 is no longer restrained by the timing mechanism E and tends to raise the bread racks D with considerable violence. However, the shock absorbing device G absorbs the excess energy. The gear segment 113 being meshed with pinion 114 as previously explained accelerates rotation of flywheel 117. The energy of spring 73 is thus absorbed by the flywheel and the shock which would otherwise occur is absorbed. In moving the parts to normal position roller 151 is moved out of engagement with cam 152 and the switch mechanism opened.

The advantages of the invention are manifest. The device will operate continuously without attention. With our invention no leakage parts to get plugged are relied on. With our invention the results can be accurately duplicated without close machining. The device is simple in operation and can be manufactured at a reasonable cost. The device serves a threefold purpose, namely, to absorb the shock occasioned by the timing mechanism, to assist in releasing the carriage and to absorb the shock produced by the release of the bread racks.

Changes in the specific form of our invention, as herein described, may be made within the scope of what is claimed without departing from the spirit of our invention.

Having described our invention, what we claim as new and desire to protect by Letters Patent is:

1. In a bread toaster, guide means, a bread rack guided thereby and movable toward and from toasting position, spring means connected to said bread rack and adapted to be energized upon movement of the bread rack into toasting position and urging movement of the bread rack from toasting position, latching means engageable with a part movable with said bread rack for holding said bread rack in toasting position in opposition to said spring means, a timing device operating said latching means including a pivoted part rotatable during the timing period and operating said latching means to release said bread rack at the end of a timing period, said pivoted part being driven by said spring means and moving during the timing period, a flywheel, rotary transmission means between said pivoted part and said flywheel and imparting rotary movement to said flywheel during the timing period, the momentum of said flywheel at the moment of release of said bread rack assisting said spring means in driving said pivoted part to effect positive release of said bread rack.

2. In a bread toaster, guide means, a bread rack guided thereby and movable toward and from toasting position, spring means connected to said bread rack and adapted to be energized upon movement of the bread rack into toasting position and urging movement of the bread rack from toasting position, latching means engageable with a part movable with said bread rack for holding said bread rack in toasting position in opposition to said spring means, a timing device operating said latching means including a pivoted part constantly urged to rotate by said spring means in a direction to give to said part a step by step movement to effect the timing period, and a flywheel connected to said part and driven thereby, said flywheel during the timing period absorbing the energy produced in said part upon initiation of the movement of said part at each step of the movement thereof, at the moment of release assisting said spring means in releasing the bread rack and upon release absorbing the excess energy imparted to the bread rack.

3. In a bread toaster a support, guide means carried thereby, a bread rack supported and guided for movement by said guide means and movable toward and from toasting position, spring means connected to said break rack and serving to move said bread rack toward non-toasting position, manual control means connected to said bread rack and moving the same and being adapted to energize said spring means upon movement of the bread rack into toasting position, a timing device including a rotatable member, a catch engaging member carried thereby and serving when moved in one direction to actuate said timing device, a movable catch carried by said support and movable into a position to engage said catch engaging member, said catch being connected to said spring means and being moved thereby to operate said timing device and when reaching a position where the spring means is partially deenergized releasing said bread rack, a flywheel rotatably carried by said support and driven by said rotatable member at a greater rate of speed than said rotatable member, said flywheel absorbing energy during actuation of said timing device and releasing said energy to assist said partially deenergized spring means to release said catch, and further absorbing the shock occasioned by movement of the bread rack away from toasting position.

4. In a bread toaster a support, guide means carried thereby, a bread rack supported and guided for movement by said guide means and movable toward and from toasting position, spring means connected to said bread rack and serving to move said bread rack toward non-toasting position, manual control means connected to said bread rack and moving the same and being adapted to energize said spring means upon movement of the bread rack into toasting position, a timing device including a rotatable member, said spring means being also connected to and operating said timing mechanism, catch means connected to and holding said bread rack in toasting position, said timing mechanism being connected to and operating said catch means to release the same and free said bread rack at the end of a toasting period, said spring means first operating said timing mechanism and subsequently and upon release of said catch means moving the bread rack into non-toasting position, a flywheel rotatably carried by said support and driven by said rotatable member, said flywheel having greater momentum than said rotatable member and absorbing energy during actuation of said timing device and releasing said energy to assist said partially deenergized spring means to release said catch means, and further absorbing the shock occasioned by movement of the bread rack away from toasting position upon release of said catch means.

5. In a bread toaster a support, guide means carried thereby, a bread rack supported and guided for movement by said guide means and movable toward and from toasting position, spring means connected to said bread rack and serving to move said bread rack toward non-toasting position, manual control means connected to said bread rack and moving the same and being adapted to energize said spring means upon movement of the bread rack into toasting position, a timing device including a rotatable member, said spring means being also connected to and operating said timing mechanism, catch means connected to and holding said bread rack in toasting position, said timing mechanism being connected to and operating said catch means to release the same and free said bread rack at the end of a toasting period, said spring means first operating said timing mechanism and subsequently and upon release of said catch means moving the bread rack into non-toasting position, a flywheel rotatably carried by said support and driven by said rotatable member, said flywheel being driven at a greater rate of speed than said rotatable member and absorbing energy during actuation of said timing device and releasing said energy to assist said partially deenergized spring means to release said catch, and further absorbing the shock occasioned by movement of the bread rack away from toasting position upon release of said catch means.

References Cited in the file of this patent

UNITED STATES PATENTS

| Number | Name | Date |
|---|---|---|
| 551,274 | Fundinger et al. | Dec. 10, 1895 |
| 557,192 | Curtis | Mar. 31, 1896 |
| 1,504,546 | Curtis | Aug. 12, 1924 |
| 1,926,276 | Forbes | Sept. 12, 1933 |
| 2,201,456 | Sardeson | May 21, 1940 |
| 2,253,637 | McCullough | Aug. 26, 1941 |
| 2,319,997 | Ireland | May 25, 1943 |
| 2,553,593 | Lermont | May 22, 1951 |